United States Patent [19]

Ramanathan et al.

[11] Patent Number: 5,269,995
[45] Date of Patent: Dec. 14, 1993

[54] COEXTRUSION OF MULTILAYER ARTICLES USING PROTECTIVE BOUNDARY LAYERS AND APPARATUS THEREFOR

[75] Inventors: Ravi Ramanathan; Walter J. Schrenk; John A. Wheatley, all of Midland, Mich.

[73] Assignee: The Dow Chemical Company, Midland, Mich.

[21] Appl. No.: 955,788

[22] Filed: Oct. 2, 1992

[51] Int. Cl.⁵ .............................................. B29C 47/06
[52] U.S. Cl. .................................. 264/171; 264/173; 264/211; 425/131.1; 425/133.5; 425/145; 425/462
[58] Field of Search ................... 264/171, 173, 211; 425/131.1, 133.5, 462, 145

[56] References Cited

U.S. PATENT DOCUMENTS

| | | | |
|---|---|---|---|
| 3,315,306 | 4/1967 | Ladner et al. | 425/133.5 |
| 3,555,128 | 1/1971 | Schrenk | 264/171 |
| 3,711,176 | 1/1973 | Alfrey, Jr. et al. | |
| 3,759,647 | 9/1973 | Schrenk et al. | |
| 3,980,744 | 9/1976 | Cogswell | |
| 4,094,947 | 6/1970 | Alfrey, Jr. et al. | 264/171 |
| 4,187,269 | 2/1980 | Hutchinson et al. | |
| 4,197,069 | 4/1980 | Cloren | |
| 4,265,693 | 5/1981 | Nishimoto et al. | 425/131.1 |
| 4,310,584 | 1/1982 | Cooper et al. | 264/171 |
| 4,477,521 | 10/1984 | Lehmann et al. | 264/171 |
| 4,485,062 | 11/1984 | Daives et al. | |
| 4,540,623 | 9/1985 | Im et al. | |
| 4,592,885 | 6/1986 | Ichino et al. | |
| 4,600,550 | 7/1986 | Clören | |
| 4,842,791 | 6/1989 | Gould et al. | 264/171 |
| 5,094,788 | 3/1992 | Schrenk et al. | 264/173 |
| 5,094,793 | 3/1992 | Schrenk et al. | 264/173 |

FOREIGN PATENT DOCUMENTS 61-108524 5/1986 Japan .................................. 264/171

OTHER PUBLICATIONS

Schrenk et al., "Interfacial Flow Instability in Multi-layer Coextrusion" Polymer Engineering and Science, vol. 18, No. 8, Jun. 1978.

Radford et al. "Reflectivity of Iridescent Coextruded Multilayered Plastic Films" Polymer Engineering and Sci., May 1973 vol. 13, No. 3.

Primary Examiner—Jeffery Thurlow

[57] ABSTRACT

A process and apparatus for the coextrusion of a multilayer polymeric body is provided which incorporates protective boundary layers into the body, protecting the layers from instability and breakup during layer formation and multiplication. The process includes the steps of providing at least first and second streams of heat plastified extrudable thermoplastic material which are combined to form a composite stream having the first substreams and second substreams interdigitated. A third stream of heat plastified thermoplastic material is supplied to the exterior surfaces of the composite stream to form protective boundary layers adjacent the walls of the coextrusion apparatus through which the heat plastified polymer streams pass. Layer instability and breakup are avoided using process conditions which would otherwise adversely affect the optical and/or mechanical properties of the articles which are formed.

18 Claims, 6 Drawing Sheets

COEXTRUSION OF MULTILAYER ARTICLES USING PROTECTIVE BOUNDARY LAYERS AND APPARATUS THEREFOR

BACKGROUND OF THE INVENTION

This invention relates to multilayered coextruded articles, and more particularly to methods of coextruding such multilayered articles to prevent layer breakup and apparatus therefor.

The coextrusion of multilayer sheets and other articles wherein individual layer thicknesses are on the order of microns is known in the art. For example, Schrenk, U.S. Pat. Nos. 3,773,882 and 3,884,606, teaches devices which prepare multilayered coextruded thermoplastic polymeric materials having substantially uniform layer thicknesses. The feedblock of the coextrusion device receives streams of the diverse thermoplastic polymeric materials from sources such as heat plastifying extruders. The streams of resinous materials are passed to a mechanical manipulating section within the feedblock. This section serves to rearrange the original streams into a multilayered stream having the number of layers desired in the final body.

Optionally, this multilayered stream may be subsequently passed through a series of layer multiplying means (sometimes termed interfacial surface generators) in order to further increase the number of layers in the final body as is described in Schrenk et al, U.S. Pat. No. 3,759,647. The multilayered stream is then passed into an extrusion die which is so constructed and arranged that streamlined flow is maintained therein. Such an extrusion device is described in Chisholm et al, U.S. Pat. No. 3,557,265. The resultant product is extruded to form a multilayered body in which each layer is generally parallel to the major surface of adjacent layers. This technology may be termed microlayer coextrusion technology because of the thinness of the layers which are formed. Microlayer coextrusion is to be distinguished from conventional multilayer coextrusion which typically involves the production of less than about fifteen layers each having thicknesses which may be from one to two orders of magnitude greater than the layer thicknesses produced in microlayer coextrusion.

One of the major problems associated with microlayer coextrusion technology has been flow instability which can occur whenever two or more polymers are simultaneously extruded through a die. Such instability may cause waviness and distortions at the polymer layer interfaces. In severe instances, the layers may become intermixed and lose their separate identities. This phenomenon, termed layer breakup, is unique to microlayer coextrusion technology where individual layer thicknesses approach about 10 $\mu$m or less adjacent to the walls of the feedblock, layer multiplying means, or coextrusion die of the coextrusion apparatus.

Flow of multiple polymer layers through the feedblock and interfacial surface generators entails both shear and extensional flow. However, flow outside of the extrusion die is shear-free, extensional flow. Layer breakup occurs inside flow channels very close to the channel walls where shear flow predominates. Factors that may affect or cause layer breakup include small layer thickness (i.e., 10 $\mu$m or less), shear stress, interfacial tension between polymer layers, interfacial adhesion between the polymer melt and channel walls, and combinations of these factors.

Schrenk et al, "Interfacial Flow Instability in Multilayer Coextrusion", *Polymer Engineering and Science*, vol. 18, no. 8 (June 1978), identified a problem of flow instability in conventional multilayer coextrusion of a three-layer sheet at the die land. The authors suggested several potential solutions including increasing skin layer thickness nearest the die wall, decreasing the viscosity of the layer nearest the die wall by either increasing temperature or switching to a lower viscosity resin, reducing the total extrusion rate, or increasing the die gap. The authors noted a further potential problem involved in the introduction of lower viscosity skin layers in that nonuniform layer distribution could occur because of the viscosity mismatch between layers.

Im et al, U.S. Pat. No. 4,540,623, teach a multilayer laminated article which includes a polycarbonate as one of the alternating layers using the apparatuses taught in the above-mentioned U.S. Pat. Nos. 3,773,882, 3,884,606, and 3,759,647. Im et al further describe the use of sacrificial or integral skin layers on the order of from about 1 to 10 mils (25.4 to 254 $\mu$m) thick to increase the ease of processing the articles and to protect the surfaces thereof from damage. These exterior skin layers are added immediately prior to the multilayer film exiting from the forming die or prior to layer multiplication.

Alfrey, Jr. et al, U.S. Pat. No. 3,711,176, and Radford et al, "Reflectivity of Iridescent Coextruded Multilayered Plastic Films", Polymer and Engineering Science, Vol. 13, No. 3, pp. 216–221 (May 1973), teach a multilayered highly reflective thermoplastic body fabricated using the multilayer coextrusion devices of Schrenk, discussed above. The reflective optically thin film layers of Alfrey, Jr. et al and Radford et al relied on the constructive interference of light to produce reflected visible, ultraviolet, or infrared portions of the electromagnetic spectrum. Further, as such optically thin films are highly reflective at wavelengths where there is constructive interference, the multilayer films were made up of only a few hundred layers or less. Desired layer thicknesses could be achieved by layer thinning during extensional flow outside the feedblock and layer multiplying apparatus. Individual layer thicknesses inside the coextrusion apparatus could be maintained above the level where flow instabilities and layer breakup occur.

More recently, multilayer coextrusion technology has been used to fabricate reflective multilayer films and sheets made up of optically thick layers (optical thickness of greater than 0.45 $\mu$m) or a combination of optically thick and optically very thin layers (optical thickness of less than 0.09 m). See, Wheatley et al, U.S. Pat. No. 5,122,905 and Wheatley, U.S. Pat. No. 5,122,906. The importance of uniform layers, i.e., layers having no waviness, distortions, or intermixing, is paramount in applications where the optical properties of the multilayered article are used. Even modest instabilities in processing, resulting in layer breakup in as few as 1% of the layers, may severely detract from the reflectivity and appearance of the article. Moreover, the reflectivities of multilayer films using optically thick and optically very thin layers is dependent upon the number of layer interfaces. To increase the reflectivity of the body or film, the total number of layer interfaces must be increased. As the number of layers in such articles is increased in the coextrusion apparatus, individual layer thicknesses become smaller so that the breakup of even a relatively few layers can cause substantial deterioration of the optical properties of the article even though its mechanical properties such as strength, environmental stress crack resistance, gas or moisture barrier, and heat distortion may remain largely unaffected.

To achieve reflectivities of 80% or greater, the number of layers in the bodies of Wheatley et al U.S. Pat. No. 5,122,905 and Wheatley U.S. Pat. No. 5,122,906 generally need to be in excess of one thousand or more. The creation of this number of layers requires that the individual layers be multiplied several times in interfacial surface generators. As the layers become thinner, layer instability and breakup may become a significant problem.

Accordingly, there remains a need in the art for a process and apparatus for coextruding multilayer polymeric articles which avoids layer instabilities and layer breakup problems, especially in multilayer articles having individual layer thicknesses of less than about 10 μm adjacent to the walls of the feedblock, layer multiplying devices, or extrusion die of the coextrusion apparatus.

SUMMARY OF THE INVENTION

The present invention meets that need by providing an improved process for coextruding multilayer polymeric articles which avoids prior art problems of layer instability and layer breakup by providing protective boundary layers during the coextrusion process. While the process is useful in the production of a wide variety of multilayer articles, it is particularly useful in the production of multilayer polymeric reflective bodies having from several hundred to several thousand layers. The requirement for a large number of layers, the physical thinness of the layers, and the need for layer uniformity to provide optimum optical properties all make process demands which heretofore could not be met by conventional coextrusion technology.

In accordance with one aspect of the present invention, a process for the coextrusion of a multilayer polymeric body is provided which incorporates protective boundary layers into the body, protecting the layers from instability and breakup during layer formation and multiplication. The process includes the steps of providing at least a first stream and a second stream of heat plastified extrudable thermoplastic material and dividing each of the streams into a plurality of first substreams and a plurality of second substreams, respectively.

The substreams are combined to form a composite stream having the first substreams and second substreams interdigitated (i.e., arranged in an alternating layered relationship). A third stream of heat plastified thermoplastic material is supplied to the exterior surfaces of the composite stream to form protective boundary layers adjacent to the walls of the coextrusion apparatus through which the heat plastified polymer streams pass. The third stream of thermoplastic material has a viscosity less than that of either the first or second streams of thermoplastic material and is supplied at a volumetric flow rate which is from about 1–12.5% of the total volume of the composite stream.

We have found that by using a material to form the protective boundary layer which has the same or a lower viscosity than that which is used in the core layers of the body, layer instability and breakup is avoided using process conditions which would otherwise adversely affect the optical and/or mechanical properties of the articles which are formed. As the protective boundary layers do not enhance the optical performance of the multilayer bodies and add to the thickness of the body, it is preferable to use the minimum amount of protective boundary layer material while still avoiding layer instability and breakup.

To increase the number of layers, the composite stream having the protective boundary layers is mechanically manipulated by dividing and then recombining the composite stream. Several mechanical manipulating steps may be performed where it is desired to produce a multilayer body having in excess of a thousand layers. The mechanically manipulated stream is then formed into a multilayer polymeric body having a multiplicity of layers of the first and second thermoplastic materials which are generally parallel to one another by passing the manipulated stream through a suitably-shaped extrusion die. In a preferred embodiment of the invention, the multilayer body has from about 500 to about 5000 layers.

Where it is desired to produce a reflective article, the multilayer body will comprise a sufficient number of alternating layers of the first and second polymeric materials which differ in refractive index and which are either optically thick or optically very thin as taught in the aforementioned Wheatley et al and Wheatley patents, the disclosures of which are hereby incorporated by reference. The practice of the present invention is also useful in the manufacture of reflective articles having optically thin layers such as the articles taught in Alfrey et al, U.S. Pat. No. 3,711,176, or articles having combinations of optically thick, thin, and very thin layers as taught in Wheatley et al, U.S. Pat. No. 5,126,880, the disclosures of which are also incorporated by reference. The number of alternating layers is preferably such that at least 30% of light incident on the body is reflected. For the reflective bodies of Wheatley et al and Wheatley, the optically thick layers are too thick to cause visible iridescent effects (visually perceived as one or more of a variety of colors), while the very thin layers are too thin to cause such effects. The resulting multilayered polymeric body reflects substantially white light and exhibits a silvery, metallic appearance.

The terms "reflective", "reflectivity", "reflection", and "reflectance" as used herein refer to total reflectance (i.e., ratio of reflected wave energy to incident wave energy) sufficiently specular in nature such that the polymeric body has a metallic appearance. The use of these terms is intended to encompass semi-specular or diffuse reflection such as that of brushed metal, pewter, and the like. In general, reflectance measurement refers to reflectance of light rays into an emergent cone with a vertex angle of 15 degrees centered around the specular angle.

A specific intensity of reflectance, when used herein, is the intensity of reflection which occurs at a wavelength where negligible absorption occurs. For example, a silver appearing article reflects substantially all visible wavelengths, whereas the introduction of a dye to achieve other metallic hues will necessarily lower reflectivity of the body at the absorbing wavelengths. Wavelengths unaffected by the dye will be reflected at essentially the same intensity as a non-dyed sample, and it is at these unaffected wavelengths to which the intensity of reflection is referring.

A number of substantially transparent polymers are suitable for use in the present invention. In a preferred embodiment, the first polymeric material is a polycarbonate and the second polymeric material is polymethyl methacrylate. The third polymeric material used as the protective boundary layer is preferably also a polycarbonate having a higher melt flow (i.e., lower viscosity) value.

The polymeric body may also comprise three or more alternating layers of diverse polymeric materials, with protective boundary layers. Repeating patterns such as ABCBA and ABCABC may be used. Polymers making up the third layer in the repeating pattern may be used as moisture or gas barrier layers, or may be used as toughening layers. Additionally, the use of optically thin layers of a third polymer may suppress undesired higher order reflections from the body. In some instances, the third layers may be adhesive layers to bond the other layers in the multilayer article together.

A skin layer may be provided on the exterior surfaces of the manipulated stream either prior to shaping the manipulated stream into the multilayer polymeric body or after the body leaves the extrusion die. The skin layer may be sacrificial, or may be permanent and serve as a scratch resistant or weatherable protective layer. Further, such skin layers may be post-applied to the body after coextrusion. For example, a skin layer may be applied as a sprayed-on coating which acts to level the surface of the body to improve optical properties and impart scratch resistance, chemical resistance, and/or weatherability. The skin layer may also be laminated to the multilayer body. Lamination is desirable for those polymers which are not readily coextrudable.

In some embodiments of the invention it may be desirable to incorporate coloring agents such as dyes (including fluorescent dyes, thermochromic materials, and electrochromic materials) or pigments into one or more of the individual interior layers of the polymeric body or into one or both of the outer skin layers of the body. This can be done to one or both of the outer or skin layers of the body, or alternatively, the coloring agent may be incorporated into one or more interior layers in the body. The coloring agents may be selected to give the polymeric body a metallic appearance other than its normal silvery appearance such as bronze, copper, or gold, for example.

Different colors such as black, blue, red, yellow, white, and the like may also be used. Typically, it is most desirable to use pigmented coloring agents in the interior layers to provide opaqueness and a two-sided mirror-like reflective quality and to use dyes on exterior surface layers. Coloring agents may be used in combination to provide desirable coloring and optical properties. For example, a pigmented white coloring agent may be used in an interior surface while a colored dye, such as blue, yellow, red, or green may be included on one or more surface layers to provide a unique reflective colored effect.

Further, while the normal surface of the body is smooth to give a highly reflective silver appearance, in some instances it may be desirable to give the surface of the body a roughened or brushed appearance to simulate a brushed metallic appearance. Further, a solvent may be used to etch the surface of the multilayer body to provide a matte or pewter look to the body. Additionally, the body may be embossed with a variety of patterns to provide desirable optical effects.

In another embodiment of the invention, a process for the coextrusion of a multilayer polymeric body is provided and includes the steps of providing at least a first stream and a second stream of heat plastified extrudable thermoplastic material and dividing each of the streams into a plurality of first substreams and a plurality of second substreams, respectively. The substreams are combined to form a composite stream having the first substreams and second substreams interdigitated.

In this embodiment, the composite stream may be mechanically manipulated to provide an increased number of layers prior to incorporation of protective boundary layers on the exterior surfaces of the manipulated stream. A third stream of heat plastified thermoplastic material is then provided to the exterior surfaces of the manipulated stream to form protective boundary layers. Again, the third stream of thermoplastic material has a viscosity which is equal to or less than that of either the first or second streams of thermoplastic material and is supplied at a volumetric flow rate which is from about 1-12.5% of the total volume of the manipulated stream.

Further mechanical manipulation may then be carried out on the layered stream having the protective boundary layers to provide an increased number of layers in the manipulated stream. Finally, the manipulated stream is shaped into a multilayer polymeric body having a multiplicity of layers of the first and second thermoplastic materials generally parallel to one another.

The present invention provides a process for preventing layer breakup in the coextrusion of a multilayer polymeric body and during the formation and manipulation of the multiple layers of polymers. The process includes the steps of providing at least a first stream and a second stream of heat plastified extrudable thermoplastic material and dividing each of the streams into a plurality of first substreams and a plurality of second substreams, respectively. The substreams are then combined to form a composite stream having the first substreams and second substreams interdigitated.

A manipulated stream is then formed by mechanically manipulating the composite stream by flowing portions of the composite stream through a plurality of conduits to provide an increased number of layers while preventing breakup of the layers. The prevention of layer breakup is accomplished, in accordance with the present invention, by performing at least one of the following steps prior to or during the formation of the manipulated stream: a) reducing shear stress at the walls of the plurality of conduits; b) reducing shear rate at the walls of the plurality of conduits, such as by reducing the rate of extrusion; and/or c) increasing the layer thickness adjacent to the walls of the plurality of conduits. The manipulated stream is then shaped into a multilayer polymeric body having a multiplicity of layers of the first and second thermoplastic materials with the layers being generally parallel to one another.

In a preferred embodiment, the step of reducing shear stress at the walls of the plurality of conduits comprises using materials with a low surface tension or coating the walls of the conduits using materials with a low surface tension so that the interfacial tension between the polymer melt stream and walls is reduced. Such a step further aids in slip. In another embodiment, shear stress at the walls of the plurality of conduits can be reduced by incorporating a slip additive into the heat plastified extrudable thermoplastic material. In yet another embodiment, shear stress at the walls of the plurality of conduits may be reduced by lowering the viscosity of the layers adjacent to the walls of the conduits, i.e., by incorporating a lower viscosity material as a protective boundary layer.

The present invention also provides an apparatus for preventing layer breakup during coextrusion of a multilayer polymeric body by the generation of interfacial surfaces within a first composite stream. The composite stream comprises discrete overlapping layers of first and second polymeric materials, of which at least a pair of such discrete overlapping layers define a generally planar layer interface therebetween which lies generally in an x-z plane of an x-y-z coordinate system, and wherein the z-axis is taken as extending in the general direction of flow of the first composite stream, the x-axis extends transversely of the first composite stream and defines a transverse dimension of the layer interface, and the y-axis extends generally perpendicularly away from the planar layer interface in the thickness direction of the pair of discrete overlapping layers. The apparatus comprises means for dividing the first composite stream into a plurality of branch streams along the x-axis, such that the pair of discrete overlapping layers and the generally planar layer interface defined therebetween are distributed among two or more of the branch streams.

Means are provided to bring a third stream of heat plastified thermoplastic material to the exterior surfaces of the composite stream to form protective boundary layers. Such means are preferably located prior to the means for dividing the first composite stream into a plurality of the branch streams. Means for manipulating and repositioning the branch streams along both the x-axis and the y-axis are also provided, as are means for recombining the branch streams to form a second composite stream having a greater number of discrete overlapping layers of the polymeric material than the first composite stream.

In a preferred form, the means for dividing the first composite stream into a plurality of branch streams includes a plurality of individual inlets divided by splitting vanes, and the means for providing the third stream of heat plastified thermoplastic material may include shaped feed slots adjacent the individual inlets. The means for providing the third stream of heat plastified thermoplastic material may include means for controlling the amount of the thermoplastic material fed to the feed slots. These means can comprise adjustable valves.

The multilayer bodies produced by the present invention may find use in several different applications. For example, a multilayer article having very thin alternating layers of brittle and ductile polymers exhibits little or no stress whitening or crazing when impacted. This provides glazing or other formable sheets of plastic which do not whiten with a variety of polymeric material combinations and regardless of whether the brittle layers become cracked or not.

Where optical properties are important, as in the case of reflective multilayer bodies, the bodies of the present invention may be fabricated as a mirror-like polymeric article having at least first and second major surfaces. One or more light absorbent layers may be incorporated into the article or onto one of the major surfaces of the article. The reflective polymeric body of the present invention may also be fabricated to act as a birefringent light polarizer which polarizes a broad band of the electromagnetic spectrum.

Accordingly, it is an object of the present invention to provide an improved process and apparatus for coextruding multilayer polymeric articles which avoids prior art problems of layer breakup by providing protective boundary layers during the coextrusion process.

This, and other objects and advantages of the present invention will become apparent from the following detailed description, the accompanying drawings, and the appended claims.

DETAILED DESCRIPTION OF THE PREFERRED EMBODIMENT

Figure 1:
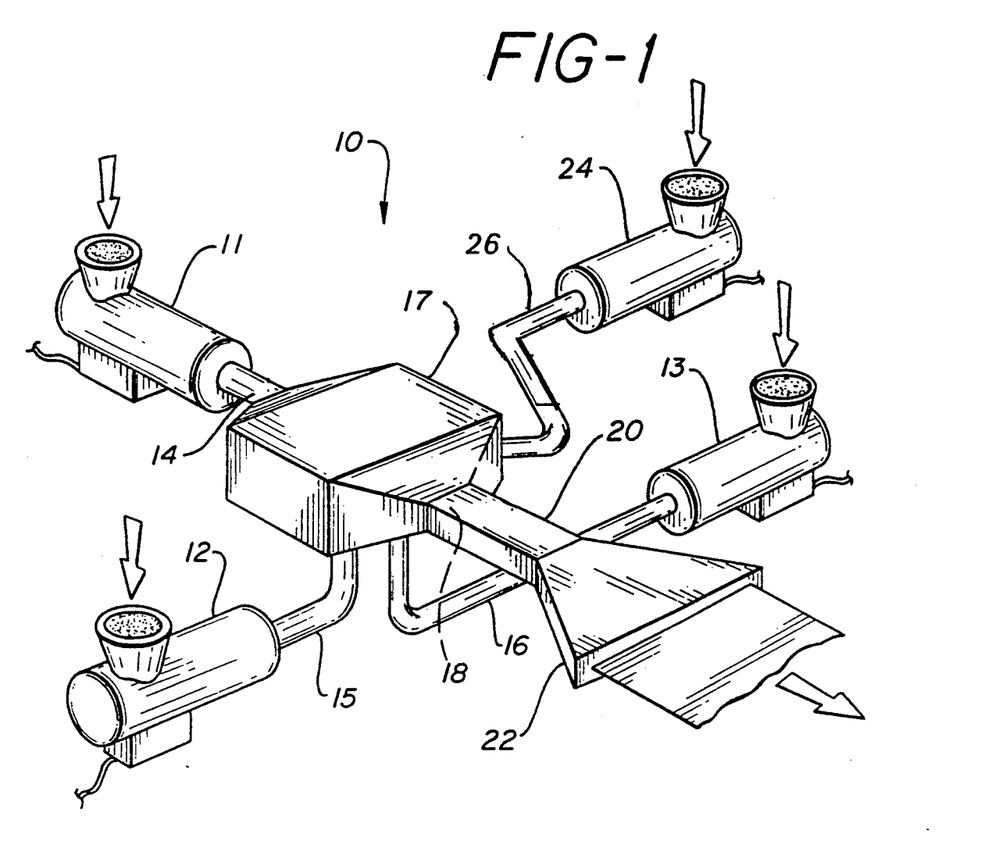
FIG. 1 is a schematic representation of an apparatus for preparing the multilayered polymeric body of the present invention.

A typical multilayer coextrusion apparatus is illustrated in FIG. 1. As shown, extrusion apparatus 10 includes, in cooperative combination, first, second, and optional third sources of heat plastified polymeric resins for extruders 11, 12, and 13, respectively. An optional third source of polymer resin may used when it is desired to produce a body having different layer repeating unit patterns such as ABCABC or ABCBABCB. The third polymer may differ in refractive index from the first and second polymers. In one embodiment, the third polymer may comprise a copolymer of the first and second components.

Extruders 11, 12, and (optionally) 13 discharge the heat plastified polymeric resins into conduits 14, 15, and 16, respectively. A coextrusion feedblock 17 is in operative combination with conduits 14, 15, and 16 and receives first, second, and optional third heat plastified streams therefrom. Feedblock 17 combines and arranges the heat plastified polymers into interdigitated, layered relationships as taught in the aforementioned U.S. Pat. Nos. 3,773,882 and 3,884,606. Feedblock 17 further defines an extrusion orifice 18 from which issues a first composite stream of polymeric material having alternating substantially planar layers of first and second (and optionally third) polymeric materials.

From orifice 18, the composite stream passes through a mechanical manipulating section 20 (interfacial surface generator) which serves to rearrange the alternating layers into a stream having more than the original number of layers as explained in greater detail below. Additional manipulating sections may be arranged in series to further multiply the number of layers in the stream. The number of additional layers created is determined by the initial number of layers times the number of channels in the interfacial surface generator or generators.

The multilayered stream is then passed into a shaping die 22 which is so constructed and arranged that streamlined flow is maintained therein. Such an extrusion die is described in U.S. Pat. No. 3,557,265, the disclosure of which is incorporated by reference herein. While a sheet or film forming die 22 is illustrated, it will be appreciated by those skilled in the art that a forming die of any desired configuration may be used to extrude not only films and sheets, but also other profiles and shapes. The configuration of the shaping die can vary and can be such as to reduce the thickness of each of the layers. The precise degree of reduction in thickness of the layers delivered from the mechanical orienting section, the configuration of the die, and the amount of mechanical working of the body after extrusion are all factors which affect the thickness of the individual layers in the final body.

Also shown schematically in FIG. 1 is an additional extruder 24 which acts as a source of protective boundary layer material. Extruder 24 discharges heat plastified polymer into conduit 26 which is in operative communication with feedblock 17 immediately upstream from interfacial surface generator 20. As will be explained and illustrated in greater detail below, the protective boundary layers serve to prevent layer breakup adjacent to the walls of the feedblock, interfacial surface generator or generators, and/or extrusion die.

Figure 2:
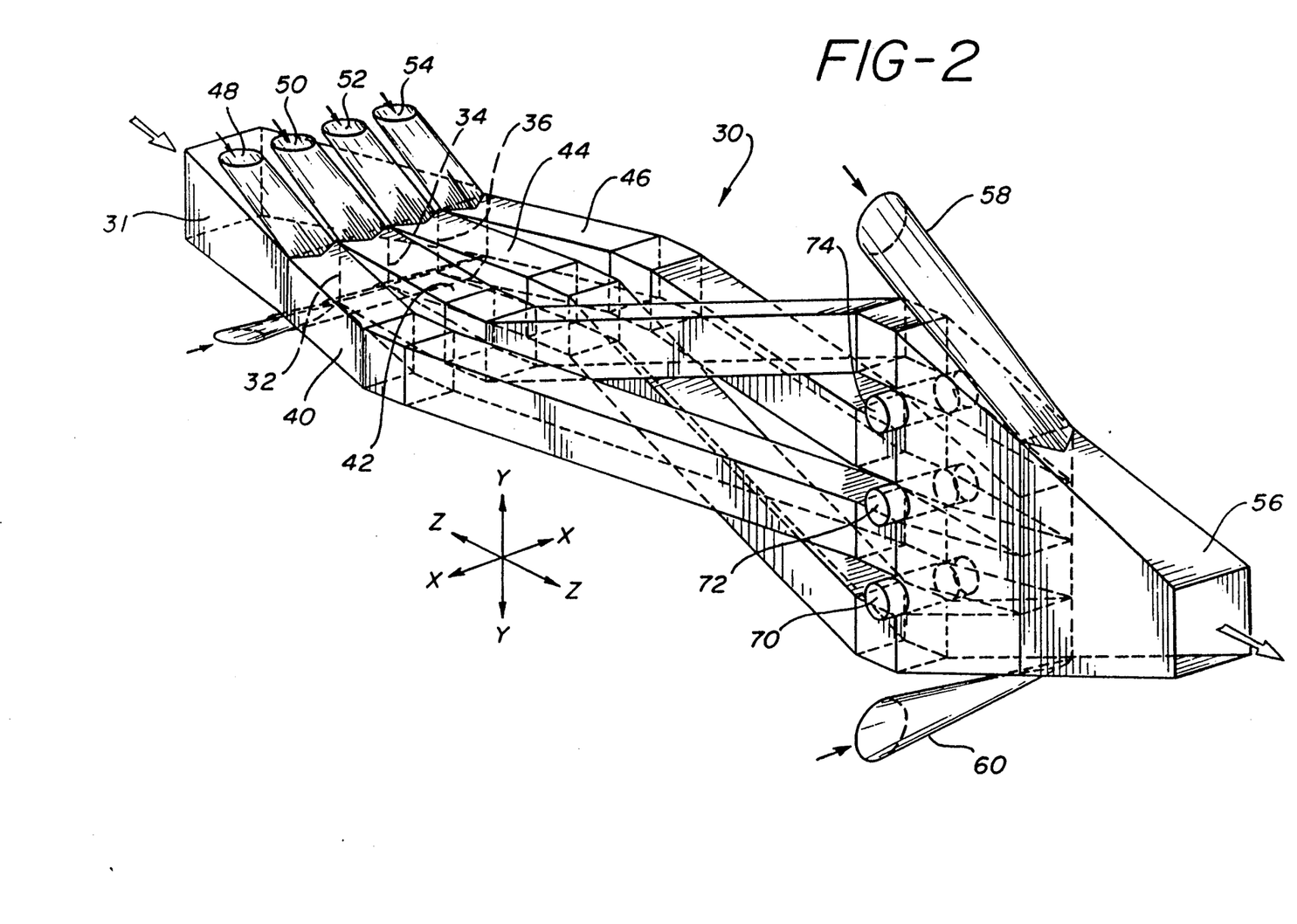
FIG. 2 is a schematic, perspective representation of an interfacial surface generator illustrating the positioning of the feed slots for the protective boundary layers and protective skin layers, respectively.

FIG. 2 illustrates schematically a preferred interfacial surface generator (ISG) construction which is used in the practice of the present invention to prevent flow instabilities and layer breakup. This preferred ISG construction is described in greater detail in commonly-assigned U.S. Pat. Nos. 5,094,793 and 5,094,788, the disclosures of which are hereby incorporated by reference.

A conventional x-y-z coordinate system has been included in FIG. 2 for ease of understanding, with the z-direction taken as corresponding to the direction of fluid polymer flow through the apparatus, the x-direction taken as corresponding to a plane parallel to the layer interfaces in the composite stream and extending transversely thereof, and the y-direction taken as corresponding to the thickness dimension of the composite, layered stream and extending generally perpendicularly from the x-axis. As shown, interfacial surface generator (ISG) 30 performs the basic functions of dividing the first composite stream issuing from orifice 18 of die 17 into a plurality of branch streams, mechanically manipulating and repositioning the branch streams, and then recombining the branch streams into a second composite stream having a greater number of discrete overlapping layers of polymeric material than the first composite stream.

As shown, a first composite stream of discrete overlapping layers of diverse polymeric materials, of which at least one pair defines a generally planar layer interfaces therebetween lying generally in the x-z plane, enters ISG 30 through regularly shaped inlet 31. The first composite stream is then divided into branch streams. In this instance, ISG 30 includes three dividing vanes 32, 34, and 36 for dividing the composite stream into four branch streams which flow through conduits 40, 42, 44, and 46, respectively, although one skilled in this art will recognize that a different number of dividing vanes may be utilized as desired.

Immediately adjacent the dividing vanes are means to bring a stream of heat plastified polymeric material to the exterior surfaces of the composite stream to form protective boundary layers as the composite stream passes through the dividing vanes 32, 34, and 36. These means are illustrated as feed slots 48, 50, 52, and 54 above inlet 31 and corresponding feed slots (not shown in detail in FIG. 2, illustrated in FIG. 4) located beneath inlet 31. While the feed slots are shown as being located immediately adjacent the dividing vanes, one skilled in this art will recognize that the protective boundary layer material may be introduced much further upstream of the vanes. Additionally, while multiple feed slots are shown, the material may be introduced through single feed slots located on either side of the composite stream.

The feed slots may be shaped, and the amount of plastified polymer supplied controlled as explained in greater detail below. The feed slots are located so that the heat plastified thermoplastic material is supplied to the exterior surfaces of the composite stream to form protective boundary layers adjacent the walls, such as the upper and lower walls of conduits 40, 42, 44, and 46, of the coextrusion apparatus through which the heat plastified polymer streams pass. The velocity of the polymer streams in the conduits increases close to and immediately past the dividing vanes which increases the shear forces encountered at the walls of these conduits at those locations.

The stream of heat plastified thermoplastic material used to form the protective boundary layers has a viscosity which is equal to or less than that of either the first or second streams of thermoplastic material and is supplied at a volumetric flow rate which is from about 1-12.5% of the total volume of the composite stream. Volumetric flow rate has been used.

We have found that the use of protective boundary layers prevents layer instability and breakup using process conditions which would otherwise adversely affect the optical and/or mechanical properties of the articles which are formed. The use of relatively thin protective boundary layers is preferred to minimize any degradation in the optical qualities of the articles which are produced and to minimize any added thickness to the article. Further, we have found that using a material which has a viscosity less than that of the polymers used in the core layers permits us to minimize the volume of protective boundary layer material used. We have found that this minimum amount of protective boundary layer material may be calculated by using the equation:

$$\% \ PBL_{min} = m\left(\frac{\eta_{PBL}}{\eta_{CORE}}\right) - b$$

where, $\% \ PBL_{min}$ is the minimum amount of protective boundary layer material needed expressed as a percentage of the total volumetric flow rate of the composite stream (including protective boundary layer material), $\eta_{PBL}$ is the viscosity of the protective boundary layer material, $\eta_{CORE}$ is the average viscosity of the first and second polymers in the polymer core layer substreams, and m and b are constants at a given shear stress and whose value is dependent upon the volumetric flow rates of the polymers and the dimensions of the conduits through which the polymers are flowing.

A number of substantially transparent polymers are suitable for use in the present invention. In a preferred embodiment, the first polymeric material is a polycarbonate and the second polymeric material is polymethyl methacrylate. The third polymeric material used as the protective boundary layer is preferably also a polycarbonate having a higher melt flow (i.e., lower viscosity) value.

The polymeric body may also comprise three or more alternating layers of diverse polymeric materials, with protective boundary layers. Repeating patterns such as ABCBA and ABCABC may be used. Polymers making up the third layer in the repeating pattern may be used as moisture or gas barrier layers, or may be used as toughening layers. In some instances, the third layers may be adhesive layers to bond the other layers in the multilayer article together. Further, they may be optically active layers which suppress undesirable higher order reflections from the body.

Referring again to FIG. 2, conduits 40, 42, 44, and 46 act to redirect and reposition the branch streams with respect to both the x and y axes. Preferably, the lengths of the conduits are substantially equal. The branch streams in conduits 42 and 44 are displaced to the greatest extent along the y-axis and the least extent along the x-axis, while the branch streams in conduits 40 and 46 are displaced to the greatest extent along the x-axis and the least extent along the y-axis so that as the branch streams are brought back together again, in the preferred embodiment shown, the branch streams are stacked generally along the y-axis. Preferably, the repositioning described above is effected without substantially changing or distorting the layers in the branch streams. The positioning of protective boundary layers along the upper and lower exterior surfaces of the branch streams aids in preventing any layer distortion or breakup due to the wall shear forces encountered as the plastified polymeric materials traverse the conduits.

While a preferred embodiment has been illustrated, it will be recognized by those skilled in this art that other layer multiplication devices may be used, including interfacial surface generators having different numbers of vanes. Additionally, one or more portions of the polymer melt stream may bypass the layer multiplication devices and then be rejoined into a composite stream.

The branch streams are then recombined in outlet 56 to form a second composite stream. As shown, the thickness of the second composite stream is contracted along the y-axis by the shape of the outlet opening. Protective skin layers may be added to the second composite stream through feed slots 58 and 60 located at the point of confluence of the branch streams in outlet 56. Alternatively, the skin layers may be added either upstream or downstream from this location. The protective skin layers may be sacrificial, or may be permanent and serve as a scratch resistant or weatherable protective layers. The skin layers may also be dyed or pigmented to provide color effects, a metallic appearance, or the like to the body. In certain instances, these protective skin layers also serve as protective boundary layers to prevent layer breakup and flow instability of the layers in the composite stream as they are reduced in thickness through shaped outlet 56.

Figure 3:
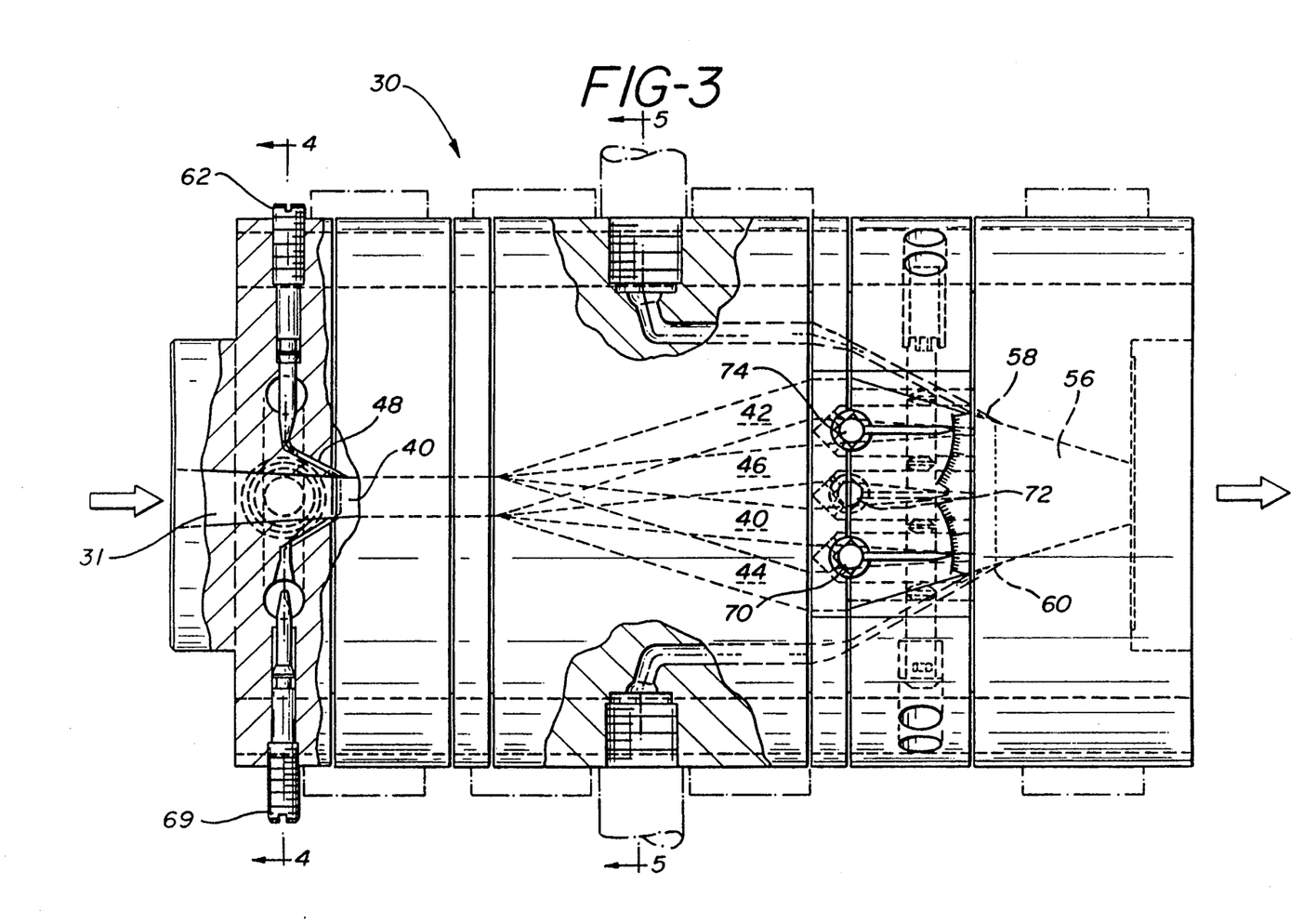
FIG. 3 is a schematic representation of the interfacial surface generator of FIG. 2.
Figure 4:
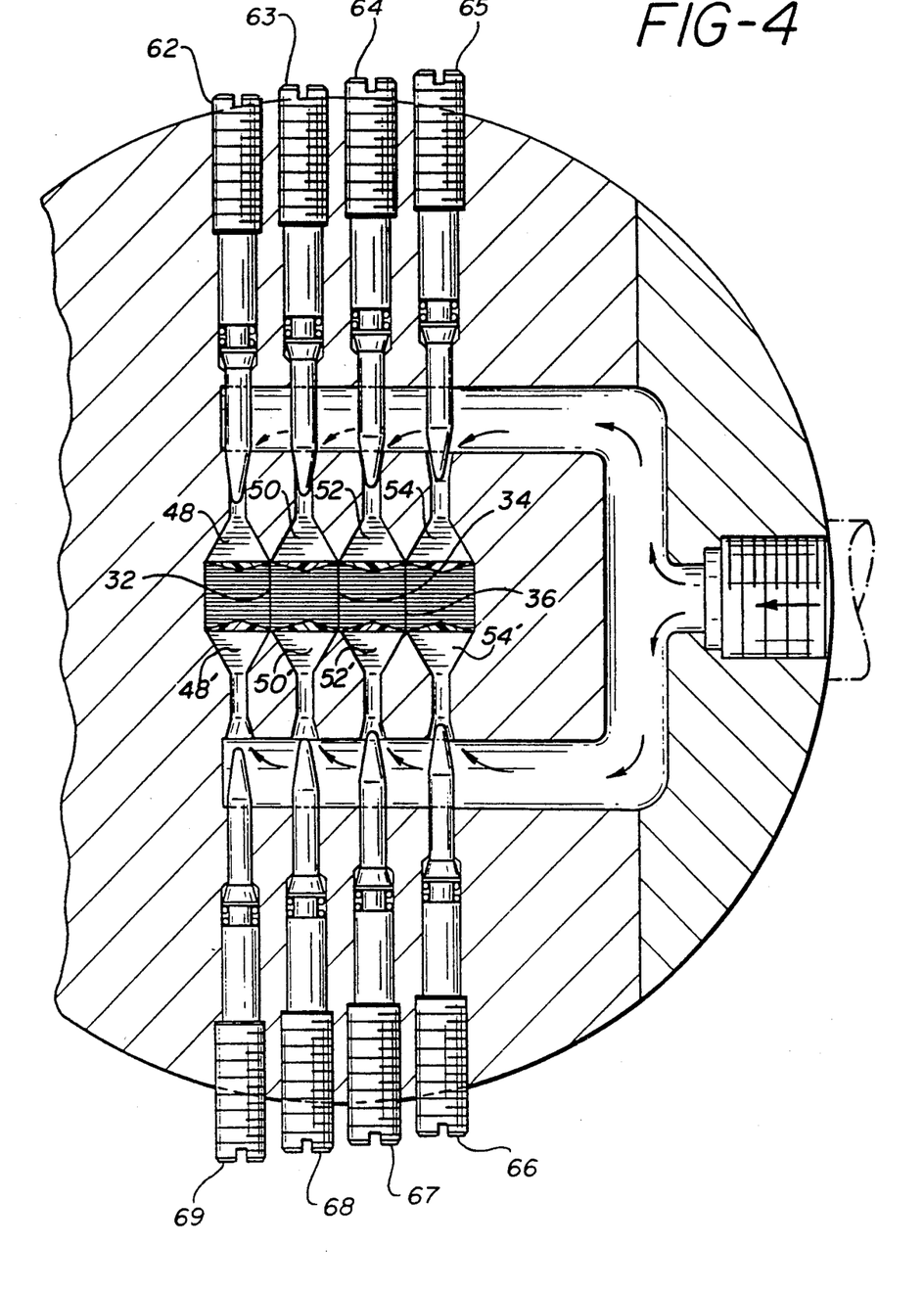
FIG. 4 is a sectional view taken along line 4—4 in FIG. 3.
Figure 5:
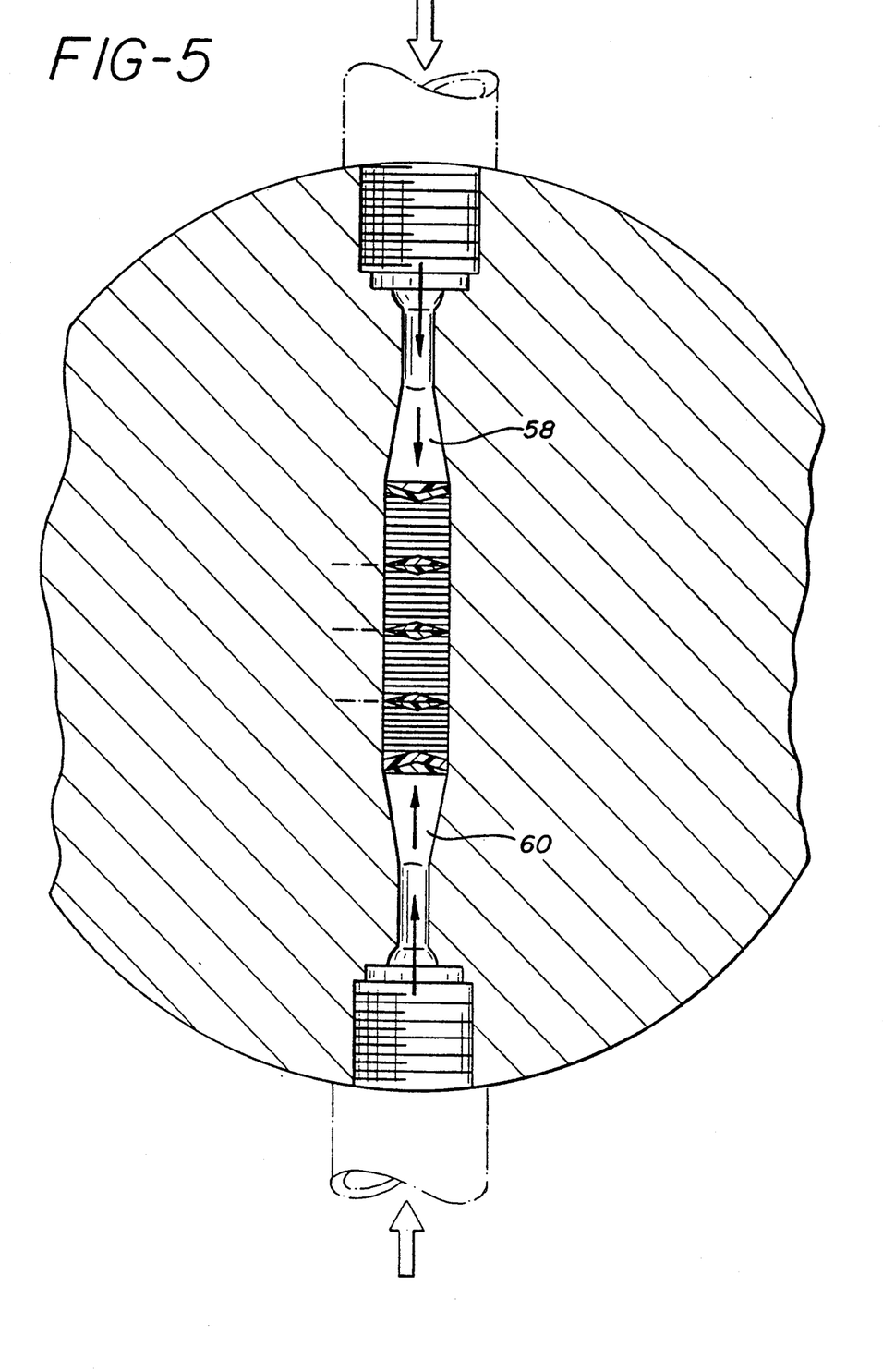
FIG. 5 is a sectional view taken along line 5—5 in FIG. 3.

FIGS. 3–5 illustrate the positioning and placement of the protective boundary layer feed slots as well as the protective skin layer feed slots. Also illustrated is a preferred embodiment in which adjustable valves are used to control the amount of heat plastified polymer introduced at the various feed slots. As shown, the first composite stream enters inlet 31 of ISG 30 and is divided into branch streams by the dividing vanes 32, 34, and 36. As best seen in FIG. 4, the protective boundary layer polymer (in heat plastified form) is introduced through feed slots 48, 50, 52, and 54 and through corresponding feed slots 48', 50', 52', and 54' to both of the exterior surfaces of the multilayer stream. As shown, the feed slots may be shaped to introduce additional amounts of polymer to the center of the feed slot. This compensates for the migration of the lower viscosity protective boundary layer polymer during subsequent flow. While the shape of the feed slots is shown in this embodiment to be triangular in cross-section, other shaped feed slots may be utilized. Adjustable valves 62, 63, 64, 65, 66, 67, 68, and 69 control the amount of heat plastified polymer introduced to the composite stream. The valves are shown in various stages of adjustment from closed (valve 62) to completely open (valve 69) for purposes of illustration.

Depending upon the total number of layers desired and their thickness, the amount of protective boundary layer polymer introduced at each feed slot may be controlled so that optimum amounts are introduced at each interface between branch stream and conduit wall. For the ISG configuration illustrated in FIG. 2, it may be desirable to introduce a heavier flow of protective boundary layer polymer at the top of conduit 42 and the bottom of conduit 44 as after the branch streams are stacked, these interfaces are subjected to the greatest shear forces when the layers in the composite stream are further thinned at shaped outlet 56. Also, as shown in FIGS. 2 and 3, valves 70, 72, and 74 may be adjusted to control the relative flow rates of the polymer streams as they are recombined in outlet 56.

Other methods for preventing layer breakup in the coextrusion of a multilayer polymeric body and during the formation and manipulation of the multiple layers of polymers are also within the scope of the present invention. The prevention of layer breakup is accomplished, in accordance with other embodiments of the present invention, by performing at least one of the following steps prior to or during the formation of the manipulated stream: a) reducing shear stress at the walls of the plurality of conduits; b) reducing shear rate at the walls of the plurality of conduits such as by reducing the rate of extrusion; and/or c) increasing the layer thickness adjacent to the walls of the plurality of conduits.

Reduction of shear stress at the conduit walls may be accomplished by coating the walls with a low surface tension material such as titanium nitride to reduce interfacial tension between the polymer melt stream and walls of the conduits. Slip additives, the compositions of which are known in the art, may be added to the plastified polymer stream or may be pumped to the wall surfaces. Shear stress may also be reduced, as taught above, by lowering the viscosity of the polymer layers adjacent to the walls. Shear rate at the walls of the conduits may be reduced by reducing the flow rate of the polymer melt stream. Finally, use of protective boundary layers to increase the thickness of the polymer layers adjacent the walls also prevents layer breakup.

In order that the invention may be more readily understood, reference is made to the following examples, which are intended to be illustrative of the invention, but are not intended to be limiting in scope.

EXAMPLE 1

A 165 layer polymeric body was formed by coextruding alternating core layers of a 10 MFR (melt flow rate) bisphenol-A polycarbonate and a 2 MFR polymethyl methacrylate using a semi-circular microlayer feed block with a 165 layer feed ring similar to the feed block taught in Schrenk, U.S. Pat. No. 3,884,606. The melt flow rate of a polymer is inversely proportional to its viscosity. The volumetric flow rate of the core layer materials supplied to the feed block was 70.2 lb/hr. The feed block was maintained at 500° F., and the extruders supplying the polycarbonate and polymethyl methacrylate were heated to 540° and 470° F., respectively.

Single feed slots were used to feed protective boundary layers (PBL) onto each exterior surface of the microlayer body downstream from the feed block. Both the volumetric flow rate and the melt flow rate of the protective boundary layer material were varied as reported in the tables below to determine the amount of protective boundary layer needed to prevent layer breakup at the conditions in the coextrusion equipment. The temperature of the extruder for the protective boundary layer material was 500° F. The PBL polymers were a series of polycarbonates commercially available from The Dow Chemical Company under the trademark Calibre and from the Teijin Chemical Company under the designation Panlite 80 melt flow. These polycarbonates had melt flow rates, respectively of 10 (Calibre 302-10), 22 (Calibre 302-22), 51 (a blend of equal parts Calibre 302-22 and Panline 80 melt flow) and 80 (Panlite 80 melt flow). Layer breakup was judged by the presence or absence of haze in the laminate caused by light scattering from scissioned layers.

TABLE 1

The PBL was Calibre 302-10 having a MFR of 10.

| PBL Rate (lb/hr) | Core Rate (lb/hr) | % PBL | Layer Breakup? |
|---|---|---|---|
| 0.0 | 70.2 | 0.0 | yes |
| 8.1 | 70.2 | 10.5 | yes |
| 9.0 | 70.2 | 11.7 | yes |
| 9.7 | 70.2 | 12.5 | no |

TABLE 2

The PBL was Calibre 302-22 having a MFR of 22.

| PBL Rate (lb/hr) | Core Rate (lb/hr) | % PBL | Layer Breakup? |
|---|---|---|---|
| 0.0 | 70.2 | 0.0 | yes |
| 1.1 | 70.2 | 1.6 | yes |
| 1.8 | 70.2 | 2.4 | yes |
| 3.8 | 70.2 | 5.0 | yes |
| 5.0 | 70.2 | 6.6 | no |

TABLE 3

The PBL was a blend of equal parts Calibre 302-10 and Panlite melt flow having a MFR of 51.

| PBL Rate (lb/hr) | Core Rate (lb/hr) | % PBL | Layer Breakup? |
|---|---|---|---|
| 0.0 | 70.2 | 0.0 | yes |
| 0.8 | 70.2 | 1.1 | yes |
| 1.6 | 70.2 | 2.2 | yes |
| 2.5 | 70.2 | 3.3 | no |

TABLE 4

The PBL was Panlite 80 melt flow having a MFR of 80.

| PBL Rate (lb/hr) | Core Rate (lb/hr) | % PBL | Layer Breakup? |
|---|---|---|---|
| 0.0 | 70.2 | 0.0 | yes |
| 0.7 | 70.2 | 1.0 | yes |
| 0.9 | 70.2 | 1.3 | yes |
| 1.3 | 70.2 | 1.7 | no |
| 6.7 | 70.2 | 8.3 | no |

Figure 6:
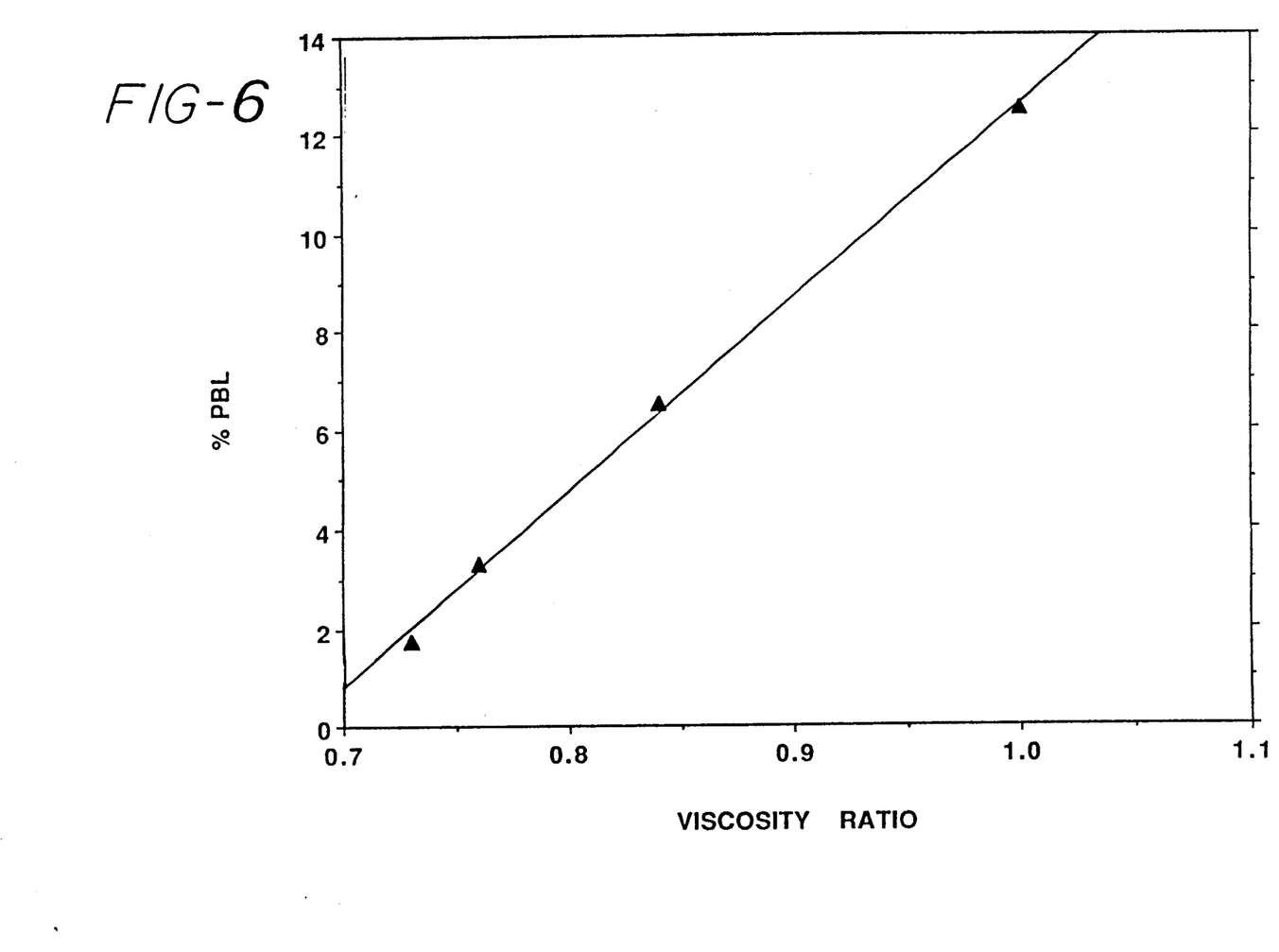
FIG. 6 is a graph of the relative viscosity of protective boundary layer material to the core layer materials versus the percentage of protective boundary layer material to total volume of material expressed as a volumetric flow rate.

The results of the runs reported in Tables 1–4 are shown in graphical form in FIG. 6. The viscosities of the PBL and core polymer layers were ratioed and reported as viscosity ratios. The results show that the minimum PBL needed to prevent layer breakup is a linear function described by the equation:

$$\% \ PBL_{min} = 39.3 \left( \frac{\eta_{PBL}}{\eta_{CORE}} \right) - 26.71$$

Operating the coextrusion equipment at conditions on or above the line shown in FIG. 6 results in the production of microlayer bodies having no layer breakup. As will be appreciated by those skilled in this art, operation of different equipment having different sized flow channels and using different flow rates for the polymers will result in different shear stresses for the polymer melt streams. Additionally, the use of different polymers which may have different interfacial tensions between the polymer melt and wall surfaces of the equipment will also result in different shear stresses. These differences, in turn, will result in a different set of constants for the above equation.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A process for the coextrusion of a multilayer polymeric reflective body comprising the steps of:
   providing at least a first stream and a second stream of heat plastified extrudable thermoplastic polymeric material,
   dividing each of the stream into a plurality of first substreams and a plurality of second substreams, respectively,
   combining the substreams to form a composite stream having said first substreams and second substreams interdigitated,
   providing a third stream of heat plastified thermoplastic polymeric material to the exterior surfaces of said composite stream to form protective boundary layers to prevent breakup of the layers of said first and second thermoplastic polymeric materials during layer manipulation and multiplication, said third stream of thermoplastic polymeric material having a viscosity which is equal to or less than that of either said first or second streams of thermoplastic polymeric material and is supplied at a volumetric flow rate which is from about 1–12.5% of the total volume of said composite stream,
   forming a manipulated stream by mechanically manipulating said composite stream having said protective boundary layers to provide an increased number of layers, and
   shaping the manipulated stream into a multilayer polymeric reflective body having a sufficient number of alternating layers of said first and second thermoplastic polymeric materials such that at least 30% of light incident on said body is reflected and wherein said first and second thermoplastic polymeric materials differ from each other in refractive index by at least about 0.03 to produce a reflective polymeric body, said layers being generally parallel to one another.

2. A process as claimed in claim 1 in which said multilayer body has from about 500 to about 5000 layers.

3. A process as claimed in claim 1 in which said first polymeric material is a polycarbonate and said second polymeric material is polymethyl methacrylate.

4. A process as claimed in claim 3 in which said third polymeric material is a polycarbonate.

5. A process as claimed in claim 1 including the step of providing protective skin layers to the exterior surfaces of said manipulated stream prior to shaping said manipulated stream into said multilayer polymeric body.

6. A process for he coextrusion of a multilayer polymeric reflective body comprising the steps of:

provinding at least a first stream and a second stream of heat plastified extrudable thermoplastic polymeric material, dividing each of the streams into a plurality of first substreams and a plurality of second substreams, respectively, combining the substreams to form a composite stream having said first substreams and second substreams interdigitated, forming a manipulated stream by mechanically manipulating said composite stream to provide an increased number of layers, providing a third stream of heat plastified thermoplastic polymeric material to the exterior surfaces of said manipulated stream to form protective boundary layers to prevent breakup of the layers of said first and second thermoplastic polymeric materials during layer manipulation and multiplication, said third stream of thermoplastic material having a viscosity which is equal to or less than that of either said first or second streams of thermoplastic material and is supplied at a volumetric flow rate which is from about 1-12.5% of the total volume of said manipulated stream, further mechanically manipulating said manipulated stream having said protective boundary layers to provide an increased number of layers, and shaping said manipulated stream into a multilayer polymeric reflective body having a sufficient number of alternating layers of said first and second thermoplastic polymeric materials such that at least 30% of light incident on said body is reflected and wherein said first and second polymeric materials differ from each other in refractive index by at least about 0.03 to produce a reflective polymeric body having layers which are generally parallel to one another.

7. A process as claimed in claim 6 in which said multilayer body has from about 500 to about 5000 layers.

8. A process as claimed in claim 6 in which said first polymeric material is a polycarbonate and said second polymeric material is polymethyl methacrylate.

9. A process as claimed in claim 8 in which said third polymeric material is a polycarbonate.

10. A process as claimed in claim 6 including the step of providing a protective skin layer to the exterior surfaces of said manipulated stream prior to shaping said manipulated stream into said multilayer polymeric body.

11. A process for preventing layer breakup in the coextrusion of a multilayer polymeric reflective body comprising the steps of:

providing at least a first stream and a second stream of heat plastified extrudable thermoplastic polymeric material, dividing each of the streams into a plurality of first substreams and a plurality of second substreams, respectively, combining the substreams to form a composite stream having said first substreams and second substreams interdigitated, forming a manipulated stream by mechanically manipulating said composite stream by flowing portions of said composite stream through a plurality of conduits to provide an increased number of layers while preventing breakup of said layers, the prevention of layer breakup being accomplished by performing at least one of the following steps prior to or during the formation of said manipulated stream:

a) reducing shear stress at the walls of said plurality of conduits, b) reducing shear rate at the walls of said plurality of conduits, c) increasing the layer thickness adjacent the walls of said plurality of conduits, and shaping the manipulated stream into a multilayer polymeric reflective body having a sufficient number of alternating layers of said first and second thermoplastic polymeric materials such that at least 30% of light incident on said body is reflected and wherein said first and second thermoplastic polymeric materials differ from each other in refractive index by at least about 0.03 to produce a reflective polymeric body, said layers being generally parallel to one another.

12. The process of claim 11 wherein the step of reducing shear stress at the walls of said plurality of conduits comprises coating the walls of said conduits with a low surface tension material.

13. The process of claim 12 wherein said low surface tension material comprises titanium nitride.

14. The process of claim 12 wherein the step of reducing shear stress at the walls of said plurality of conduits comprises incorporating a slip additive into said heat plastified extrudable thermoplastic material.

15. The process of claim 12 wherein the step of reducing shear stress at the walls of said plurality of conduits comprises lowering the viscosity of the layers adjacent the walls of said conduits.

16. An apparatus for preventing layer breakup during coextrusion of a multilayer polymeric body by the generation of interfacial surfaces within a first composite stream which comprises discrete overlapping layers of first and second polymeric materials, of which at least a pair of such discrete overlapping layers define a generally planar layer interface therebetween which lies generally in an x-z plane of an x-y-z coordinate system, where the z-axis is taken as extending in the general direction of flow of said first composite stream, the x-axis extends transversely of said first composite stream and defines a transverse dimension of the layer interface, and the y-axis extends generally perpendicularly away from the planar layer interface in the thickness direction of said pair of discrete overlapping layers, said apparatus comprising:

means for dividing said first composite stream into a plurality of branch streams along the x-axis, such that said pair of discrete overlapping layers and said generally planar layer interface defined therebetween are distributed among two or more of said branch streams;

means upstream of said means for dividing said first composite stream for providing a third stream of heat plastified thermoplastic material to the exterior surfaces of said composite stream to form protective boundary layers;

means communicating with said means for dividing said first composite stream for manipulating and repositioning said branch streams along both the x-axis and the y-axis; and means for recombining said repositioned branch streams to form a second composite stream having a greater number of discrete overlapping layers of said polymeric material than said first composite stream.

17. The apparatus of claim 16 wherein said means for dividing said first composite stream into a plurality of individual inlets divided by splitting vanes, and said means for providing said third stream of heat plastified thermoplastic material includes shaped feed slots adjacent said individual inlets.

18. The apparatus of claim 16 wherein said means for providing said third stream of heat plastified thermoplastic material includes means for controlling the amount of said thermoplastic material fed to said feed slots.

* * * * *